Feb. 13, 1934.　　　F. C. MOCK　　　1,947,162
CARBURETOR
Filed Dec. 4, 1930　　　3 Sheets-Sheet 1

INVENTOR
*Frank C. Mock.*
BY
*J. B. Smith*
ATTORNEY

Feb. 13, 1934.    F. C. MOCK    1,947,162
CARBURETOR
Filed Dec. 4, 1930    3 Sheets-Sheet 2

INVENTOR
*Frank C. Mock.*
BY
ATTORNEY

Patented Feb. 13, 1934

1,947,162

UNITED STATES PATENT OFFICE 1,947,162

CARBURETOR

Frank C. Mock, East Orange, N. J., assignor to Bendix Research Corporation, East Orange, N. J., a corporation of Indiana Application December 4, 1930. Serial No. 500,049

32 Claims. (Cl. 261—85)

This invention relates to charge forming devices, and more particularly to means for supplying a combustible fluid to an engine.

An object of the invention is to provide in a device of the foregoing character, novel means for combining the charge of combustible fluid with the air to be used as the combustion supporting medium.

Another object of the invention is to provide novel means for obtaining a uniform mixture of fuel and air in a device of the character described.

A further object of the invention is to provide novel means for obtaining a more efficient carburetion of the fuel to be delivered to the combustion chambers of the engine.

Still another object of the invention is to provide novel means for obtaining a more complete atomization of the fuel charge as it passes through the chambers leading to the point of combustion.

Another object of the invention is to provide novel means for securing greater suction or drawing power in the chambers and passages leading from the points of admission of air and fuel to the point of combustion in the engine.

Considerable difficulty has been experienced in properly carburizing fuel delivered to internal combustion engines on aircraft and in other installations wherein supercharging devices are employed. This is due to the failure of the manifold system to convey the atomized fuel to the cylinders in the state in which it leaves the carburetor, and this is particularly the case during cold weather.

The present invention tends to overcome this difficulty by providing conducting means which serve to subject the fuel spray while in its finely atomized state, to the action and influence of the engine supercharging apparatus, as a result of which the fuel is delivered in a uniform mixture of evenly distributed fuel spray.

Another feature of the invention is the provision of means for introducing air to be later carburized with the fuel in such a manner that it enters the intake of the subject apparatus in such a formation as to cause a vortex which is inherent in the structure, thereby increasing the efficiency of both the carbureting and supercharging functions, and eliminating the objectionable shock effect on the supercharger.

It is another object of this invention to provide in a combined supercharger and carburetor, novel means for regulating the supply of combustible fluid to conform to variations in the setting of the engine speed controlling means.

Still another object is to provide novel means for regulating the separate air and mixture supplies under certain conditions by the manipulation of a common operating device.

A further object of the invention is to provide a novel construction and method of operation of the fuel and air feeding devices wherein certain movements of the air regulating means are automatically communicated to the mixture regulating means so as to cause a proportionate variation in the setting of the latter, the purpose being to obtain a predetermined variation in the ratio of fuel to air for certain variations in the conditions with which the motor must contend.

A still further object is to provide a mechanism having the above characteristics that will be simple, practical, efficient in operation, and relatively inexpensive to manufacture.

Several embodiments of the invention are shown in the accompanying drawings, wherein like reference characters refer to like parts throughout the several views. It is to be expressly understood, however, that the drawings are for the purpose of illustration only, and are not designed as a definition of the limits of the invention, reference being had for this purpose to the appended claims.

Referring to the drawings, reference character 1 designates a fuel reservoir in which fuel is normally retained to a level approximately as indicated at 2, the mounting means for the reservoir being such that this level 2 is at all times maintained somewhat above the level of the fuel outlets to be described. Fuel is drawn from the reservoir 1 through a suitable conduit 3, containing a metering orifice 3a constituting the main fuel supply regulating means, to be admitted to the fuel chamber 4, in the tubular member 5 mounted centrally on the boss 6 formed integrally with the casing 7 of the carburetor.

The casing 7 is provided with a suitable recess for the reception of the member 8 constituting a centrally disposed extension of the housing 9. From the housing 9 a series of conduits 10 lead to the different fuel inlets of the motor.

Novel means are employed for supplying air to unite with the fuel supply and carry it through the conduits 10 to the motor. As shown, such means preferably comprise an air intake duct 11 leading into the spiral-shaped chamber 12, at the center of which is provided a device for imparting a turbulent, swirling motion to the air being drawn into the carburetor. As shown, such device comprises a plurality of tapering passages extending around the entire circumference of the shoulder 14 on member 8, the passages being formed by the provision of vanes 15 disposed preferably at equal intervals around the said circumference, each vane being mounted in such manner that its outer surface is approximately tangential to the circle formed by the flared edge of member 16, to be described.

There is thus provided a structure which is in the nature of a vortex functioning to direct the incoming air supply and divide the air into a series of air streams each of which increases in velocity as it passes through the narrowing passages formed by the vanes 15, the streams of air uniting again after such acceleration, and forming on their union a turbulent revolving body of air which, after becoming concentrated toward the center of the chamber formed by the vanes 15, rushes through the member 16 toward the supercharger with a combined forward and rotational movement, to be described, which serves to mitigate the shock or impact which would occur as the air strikes the transversely disposed surface of the supercharger.

From the foregoing it is apparent that the charge of air to be united with the fuel charge attains considerable rotational velocity even before reaching the supercharger, one function of which is to impart still greater velocity to such air and at the same time impart a similar velocity to the incoming charge of fuel, in addition to the further function of properly mixing and distributing the fuel and air into a uniformly finely divided stream for admission to the combustion chambers of the engine.

Part of the novel means for controlling the relative quantities of liquid fuel and air to be used comprises two valve mechanisms: one for regulating the air supply, and the other for governing the fuel supply; the movement of the latter being influenced to a certain extent by the movement of the former. By this arrangement the quantity of fuel admitted to the engine becomes, under certain conditions, a function of the quantity of air admitted, and there is therefore a definite automatically determined ratio of air to fuel under such conditions.

Figure 1:
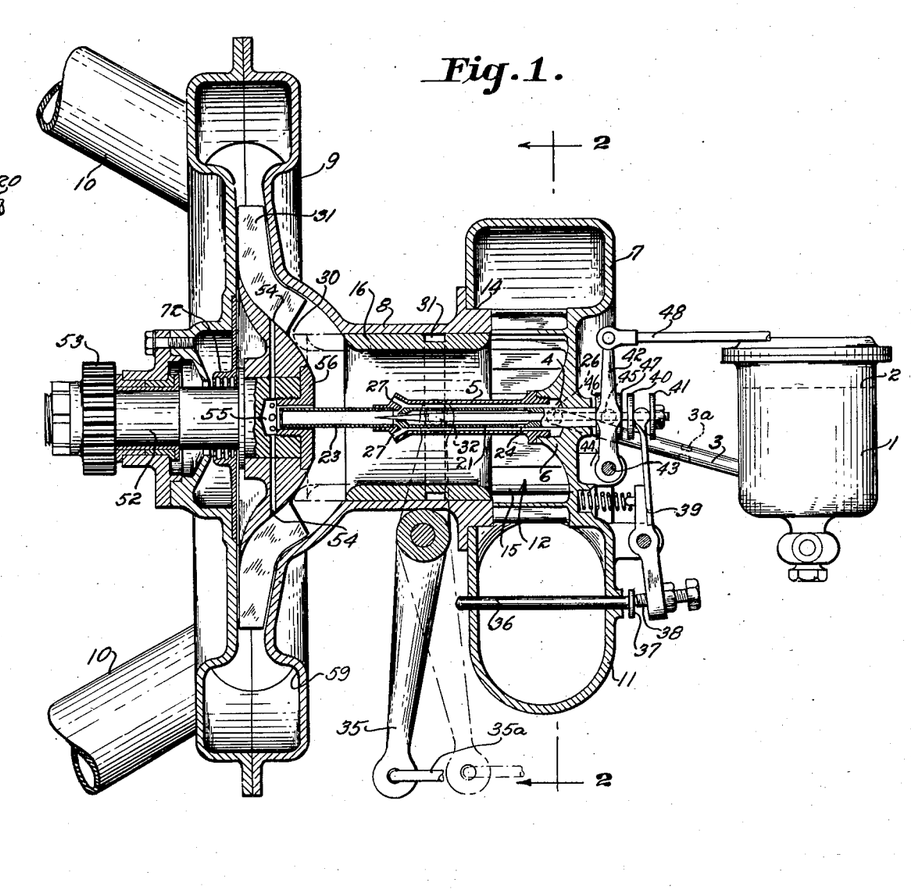
Fig. 1 is a sectional view of one embodiment of the invention.

The feeding mechanism for regulating the quantity of liquid fuel supplied to the apparatus heretofore referred to, has associated therewith novel valve mechanism comprising the usual needle member 20 extending along the interior of the central tubular member 21, the pointed end of the needle 20 being adapted to regulate the area of opening 22 at the forward end of the chamber 21 (according to the setting of the control members to be described) into jet 23. The member 21 is provided with a series of lateral apertures 24 (see Fig. 1) establishing communication with the main fuel channel formed by the outer tubular member 5. This channel in member 5 constitutes the reception chamber for the charge of liquid fuel as it is drawn from the reservoir 1 through the conduit 3, the point of entry to the chamber member 5 being indicated at 26, (Fig. 1).

Means are provided in the valve structure just described for securing a substantially uniform division and distribution of the charge of liquid fuel prior to mixture of the charge with the air supply. As shown, the preferred means for effecting such division and distribution comprises a series of outwardly direct passages 27 located near the forward end of tubular member 5 at a level somewhat below the level 2 of the fuel in reservoir 1, as above noted, and adapted to cause the ejection of a series of streamlets of the divided fuel charge in diverging paths leading into the air column passing through the valve 16, to be described.

Valve 16 constitutes part of the novel means for regulating the quantity of air supplied to the apparatus. As shown, the said valve, which has a throttling function, is preferably in the form of a cylindrical member open at both ends and with its cylindrical walls flared at either end to assist in directing the air therethrough. In the position of the valve as shown in Fig. 1, there is provided a comparatively large path of exit for the air supply by way of the chamber formed between the central portion of the casing 9 and the member 30, to be described. In the other extreme, or starting and idling setting of the valve 16, as indicated in phantom lines in Fig. 1, the path of exit along the wall of casing 9 is almost completely cut off. It will be obvious that between the two extreme settings just referred to any desired setting can be secured through operation of the control means to be described.

Figure 3:
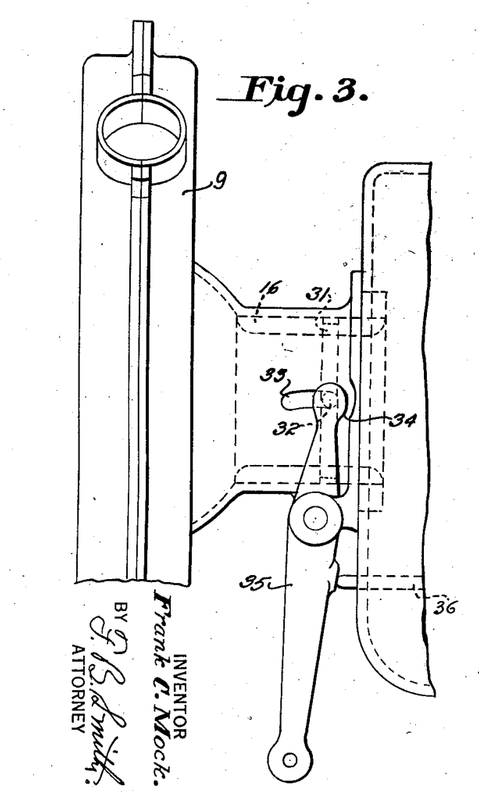
Fig. 3 is a side view showing certain details of Fig. 1.
Figure 4:
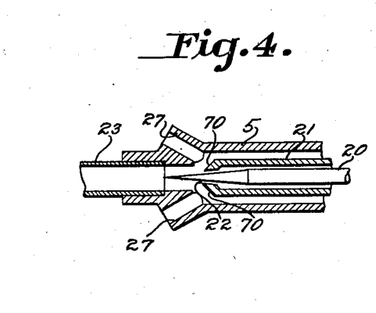
Fig. 4 is an enlarged detailed view of the fuel valve mechanism, showing the parts in the starting or priming position.

The means for shifting the valve 16 longitudinally of the member 8 to obtain a greater or less restriction of the path of exit for the air supply comprises circumferential groove 31 formed in the wall of valve 16, into which groove a pin 32 (Figs. 1 and 3) extends through the arcuate slot 33 formed in the wall of the member 8, and is integral with the upper end 34 of rocker arm 35. It will be evident from the foregoing that when a rocking motion is imparted to the arm 35 there will result a corresponding longitudinal movement of the valve 16, and therefore the quantity of air being supplied to the apparatus will depend upon the motion and setting of the arm 35.

In order to maintain a predetermined relation between the extreme setting of valve 16 and the setting of needle valve 20 controlling to a certain extent the supply of fuel, means are provided for causing an almost complete cut-off movement of the former to produce automatically a corresponding movement of the latter. As shown, such means preferably comprises a pin 36 extending through the casing of the intake duct 11, said pin having a head 37 adapted to be engaged by suitable means such as the adjustable setscrew 38 located near the lower end of resilient rocker 39, the upper end of said rocker being located between a pair of collars 40 and 41 on the outer extension of the needle valve 20. It will thus be apparent that a longitudinal rod attached to arm 35, such as to cause a movement of the member 16 to cut-off position, will also cause, through the intermediary of arm 35 and members 36 and 38, a rocking movement of the rocker arm 39 and hence, through the intermediary of the member 40 and 41, a corresponding movement of the needle valve 20 to close the port 22.

The means for effecting proper enrichment of the mixture for starting preferably consists of a rocker member 42 pivoted to the stationary structure by suitable means as indicated at 43 and 44 and provided with means 45 adapted to be received between the collars 46 and 47 on the extension of member 21. At its upper end the member 42 is adapted to receive the control lever 48 leading to a suitable manually controlled member to be operated when desired to set the apparatus for starting.

From the foregoing it will be evident that upon movement of the control rod 48 a corresponding longitudinal movement of the member 21 will result, thereby varying the quantity of fuel admitted through opening 22 to jet 23, it being understood that rod 35a at the same time is manipulated to close throttle 16 to give a high suction in chamber 55. In order to permit axial displacement of needle valve 20 by manipulation of control link 48, notwithstanding the rigid stop 37 preventing corresponding movement of pin 36 and throttle lever 35, the upper portion of rocker arm 39 is preferably made resilient, as by the use of a flat spring as shown, to permit flexing thereof relative to the lower rigid portion of the rocker arm.

Having now described the means for admitting both air and liquid fuel in adjustable quantities, and also the means for imparting an initial velocity to the air and an initial division and partial distribution of the charge of liquid fuel, it remains to describe the novel arrangement and construction of the supercharger whereby a considerably greater velocity is imparted to the combined air and fuel charge and a more perfect distribution and atomization of the fuel is effected.

Referring to Fig. 1, such means preferably consists of an impeller 30 having a series of suitably designed vanes or blades 31, the impeller being mounted on shaft 52 near the outer end of which is provided suitable means 53 for engagement with a driving connection for transmitting rotational movement to the impeller 30 whenever desired. In order to secure maximum breaking up of the charge of liquid fuel passing through the jet 23 before being caught up by the air passing through the blades 31 from the forward end of valve 16, the impeller 30 is provided with means for distributing said charge into a plurality of diverging radial paths, spaced around hub of impeller 30. As shown, the means for effecting such distribution consists of a plurality of radially disposed ducts 54, preferably of such size that the air leakage between the tube 23 and the flanged member 56 does not materially reduce the suction through the tube leading from the chamber 55 and extending outward radially to portions on the outer surface of the hub of impeller 30 between the successive blades 31. Thus that portion of the fuel charge which has not been previously ejected through the outlets 27 into the air column will now be caught up by the mixed column of air and fuel, resulting in a final mixture in which the particles of fuel impinge on blade 31, thereby dividing, and becoming diffused with the other passing charge. Such uniform distribution and atomization is further aided by the provision of the annular chamber 59 extending around casing 9. This chamber 59 serves as a collection chamber for the mixed charge and provides a space in which a more perfect mixing of the charge may proceed prior to delivery to the combustion spaces of the different cylinders by way of the respective outlets 10. The usual multi-stage pressure reducing chambers for minimizing the pressure losses are shown at 72.

There is thus provided a novel apparatus for securing a proper mixture of fuel and air and at the same time attaining the supercharging action by the use of a unitary structure which serves as both supercharger and carburetor. There has also been disclosed novel means for maintaining a predetermined ratio between the quantities of air and fuel supplied to the engine for a given setting of the control mechanism together with novel means for causing a variation in one setting to be communicated automatically to he other.

I will be obvious, however, that the invention may be embodied in constructions varying from that herein described for the purposes of illustration, but nevertheless within the scope of the invention herein disclosed. Thus, for example, the fuel charge may be caused to unite with the air supply at points other than those indicated in Fig. 1, or the union may be made to occur at only certain of said points. Similarly, the structure of the fuel and air valves may be varied in a number of ways, as is also true of the means for shifting the said valves. Similarly, the construction of the vanes 15 may be varied, or they may be omitted entirely and the same effect produced by equivalent means.

Figures 5, 6, 7, 8, 9:
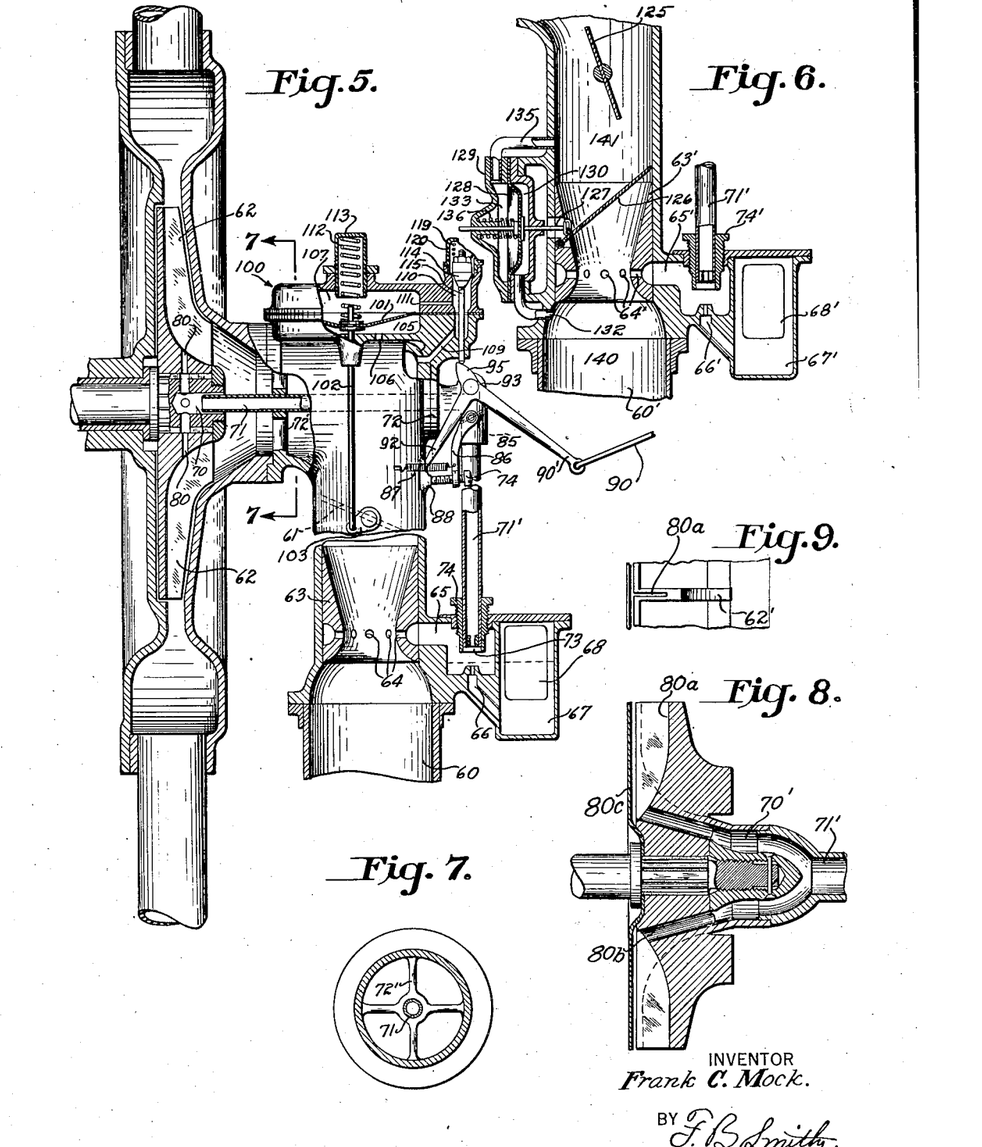
Figs. 5 and 6 illustrates other embodiments of the invention.
Fig. 7 is a view taken on the line 7—7 of Fig. 5.
Fig. 8 shows another embodiment of one principle of the invention.
Fig. 9 is a plan view of some of the parts shown in Fig. 8.

One such modification of the invention is illustrated in Fig. 5. Referring to that figure, there is shown at 60 a passage representing the air intake duct of a carburetor having a throttle valve 61 controlling the supply of air to the centrifugal impeller 62, corresponding in structure and function to the member 31 of Fig. 1. It will be seen that the passage 60 is provided with a sleeve 63 so shaped as to convert the passage 60 into a Venturi tube which will act to create a relatively high suction at the point where the radial ducts 64 are provided, these ducts serving to establish communication with the chamber 65 in which is located the fuel jet 66 adapted to be fed from the reservoir 67, in which reservoir a constant fuel lever is maintained by suitable means including the float 68. The fuel is maintained at a level which is somewhat above the nozzle of jet 66.

Figure 2:
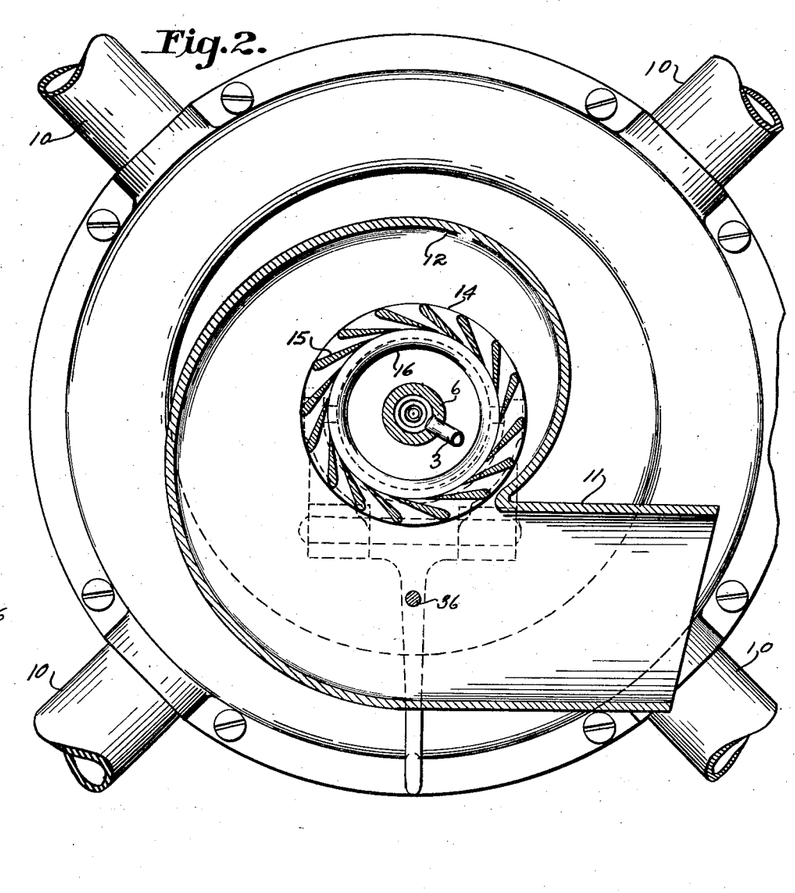
Fig. 2 is a section taken on line 2—2 of Fig. 1.

From the foregoing it will be observed that the venturi construction shown at 63 will produce an effect similar to that produced by the vane construction at 15 (Figs. 1 and 2) while the suction created at the same point will, by virtue of the communication established through the ports 64, generate a corresponding suction in the chamber 65 comparable to the suction created in the passages 27 in the construction shown in Fig. 1. For this purpose means are preferably provided, in the modification shown in Fig. 5, whereby the suction created in the chamber 65 will generate a fuel delivery to the chamber 70 corresponding to the fuel delivery produced in the chamber 55 of Fig. 1. As shown, such means preferably comprises a centrally disposed tube 71 extending freely into the chamber 70 at one end and supported near the center by a cross bracket 72' and then secured to an elbow 72, the connecting tube 71' terminating at a point just above, but directly in line with, the nozzle of jet 66. As shown by way of preference, the end of the tube 71' is provided with a sleeve 73 serving to restrict the size of the opening therein to render the same proportionate to the ports 64, the purpose being to maintain relative cross-sectional areas of such proportion that the fuel delivery through the jet 66 will be almost entirely responsive to the suction in the air passage 60, and will not be affected too greatly by the suction created in the tube 71. Means are also provided for varying the rate of delivery of fuel into the tube 71 independently of the amount of suction created in passage 60. As shown, such means preferably takes the form of an adjusting nut 74 surrounding the lower end of tube 71 and movable toward or away from the nozzle of jet 66.

It will be evident from the foregoing that the flow of air from the Venturi tube 63 will generate a suction in the chamber 65 and a corresponding fuel delivery through the nozzle 66 into the tubes 71' and 71, and thence into the chamber 70, to be divided and distributed by the radial passages 80 in the manner described with reference to the construction shown in Fig. 1.

In connection with the foregoing it is desired to provide means automatically operable to insure a sufficient draft through the nozzle 66 irrespective of variations in speed of the engine. In order to effect such a result, means have been provided to vary the opening through the fuel tube 71' in accordance with variations in the setting of the means controlling the throttle valve 61. As shown in Fig. 5, such means preferably comprises a valve 85 mounted in the tube 71', and normally held in the position shown by the provision of suitable means such as the valve arm 86, spring 87, and abutment 88. The arm 86 is in turn provided with means for causing a shifting of the valve setting in response to manipulation of the rod 90 by which the operator controls the setting of throttle valve 61. As shown, such means comprises a striker arm 92 pivoted to the casing by suitable means as indicated at 93 and having its upper end provided with a cam surface 95 for a purpose presently to be described. The striker arm is in turn adapted to be swung about its pivot by operation of the control lever 90' to which rod 90 is connected.

From the foregoing it will be evident that any movement imparted to the lever 90' by the operator in order to vary the setting of the throttle valve 61 will cause a corresponding movement of the tube valve 85, thereby varying the opening of the latter to correspond to the variation in the setting of the throttle valve 61.

In order to prevent too rapid an opening of the throttle valve 61, and to insure a sufficient delivery of fuel at all times, even when the engine is idling, and irrespective of the rapidity with which the throttle controlling lever is manipulated, means are provided for causing the shifting of the throttle 61 to lag behind the shifting of tube valve 85 and thereby create a time element of predetermined length, permitting the delivery of a sufficient quantity of fuel through the tube 71 prior to the surge of increased air flow which follows upon the opening of the throttle 61. As shown, such means comprises a casing 100 in which is located the diaphragm 101, at the center of which is provided a rod 102 connecting with the member 103 on which the throttle valve 61 is secured. The lower chamber 105 of the member 100 is provided with suitable means 106 to establish communication with the atmosphere, while the upper chamber 107 is adapted to communicate with the air intake passage 60 by suitable means such as the ports 109, the chamber 110, and the passageway 111. The spring 112 is provided in recess 113 for the purpose of tending to hold the diaphragm downward and hence the valve 61 in the position shown.

The means for controlling the pressure in the chamber 110 preferably comprises the valve 114 located in a semi-enclosed cage 120 and having a stem 115 adapted to rest upon the cam surface 95 of member 92 and therefore adapted to be raised or lowered in accordance with the movement of the lever 90, a spring 119 being provided to maintain the valve 114 in the position shown.

From the foregoing it will be seen that any change in the setting of cam 95 caused by the shifting of lever 90 will take a certain interval of time to be communicated to the throttle 61, since it is first necessary for the diaphragm 101 to respond to the difference in pressure created above and below the said diaphragm by reason of the change in the setting of valve 114 and hence in the amount of pressure existing in the chamber 107. When this difference in pressure has made itself felt upon spring 112 to the extent of producing a corresponding movement of the diaphragm 101, the valve 61 will be shifted correspondingly by virtue of the connecting rod 102. In the meantime, however, the throttle 85 has been shifted through the prompt action of the striker arm 92 against the member 86. In the manner just described, and by proper selection of dimensions to fit the requirements of the engine, a suitable time element can be provided to prevent any possibility of a break in the fuel delivery as a result of a quick change in the position of the throttle lever 90'. Likewise, this construction prevents any possibility of the delivery of too rich a mixture to the engine as a result of a quick shut-off movement of the lever 90' to an idling position after the engine has been running at high speed. Under such conditions the tubes 71 and 71' would be filled with a relatively dense column of fuel. Hence, in the absence of means such as the foregoing for retarding the transmission of the movement of the valve lever 90' to the valve 61, there is a danger that the sudden relatively great excess of fuel might produce undesirable results. Such danger is avoided by the provision of the retarding means above described, since the engine has an opportunity to consume the relatively dense mixture prior to closing of the valve 61.

There is thus provided in the construction shown in Fig. 5, means for automatically maintaining a proper relation between the amount of fuel and air supplied to the engine and at the time insuring a high degree of atomization and distribution of the combined charge as it passes through the openings 80 in the centrifugal member 62—in other words, substantially the same result as obtained by the use of the construction shown in Fig. 1, but by the employment of different means and a different mode of operation and regulation thereof.

Another method of controlling the air supply so as to insure proper fuel delivery irrespective of sudden variation in the engine speed controlling means is shown in Fig. 6. In that figure, the air intake duct 60' is shown provided with two throttle valves 125 and 126, the former being directly operable by the operator's control lever (not shown), and the latter being controlled by the operation of rod 127 actuated by a diaphragm 128 located in casing 129, one of whose chambers 130 communicate with the lower portion of passage 60 by means of the restricted cross-sectional area of duct 132, and the other chamber 133 being in registry with the intermediate portion of passage 60 by means of duct 135, also of restricted area, the restrictions in ducts 132 and 135 being for the purpose of maintaining proper pressure in the diaphragm.

With this construction it will be apparent that by proper adjustment of the tension in spring 136, a definite difference in air pressure may be maintained between the chambers 140 and 141, the difference obtaining being that which is most effective to maintain steady, well-atomized flow through the duct 71', even when the upper throttle valve 125 is in fully opened position and the engine is running slowly. The same is obviously true in respect to diaphragm 101 of Fig. 5.

In addition to the modifications above referred to, it will be obvious that other variations in construction may be resorted to without departing from the scope of the invention herein disclosed. Thus, for example, instead of providing radial passages through the centrifugal members as shown in Figs. 1 and 5, the use of a structure such as is shown in Figs. 8 and 9, will insure the attainment of an even mixing action by virtue of retarding the rotational velocity of the charge as it leaves the impeller and enters the collection chamber. Such a result is effected by providing the blades of the impeller with suitable radial grooves or openings 80a, as shown in Figs. 8 and 9, registering with oblique passages 80b and permitting a delivery of the fuel at the outer rim of the impeller (rather than at the periphery of the hub, as in Figs. 1 and 5) so as to obtain the benefit of the maximum centrifugal force available, a baffle plate 80c being mounted preferably adjacent the forward edge of the unit, as shown. Thus the fuel leading from the oblique passages will be retarded, and during such retardation will be more thoroughly mixed first by the interposition of the radial grooves 80a and secondly by the provision of the baffle plate 80c.

Likewise, other changes may be made in the construction, arrangement and method of combining the parts constituting the invention within the scope of the invention as herein disclosed. Reference is therefore to be had to the appended claims for a definition of the limits and scope of the invention.

What is claimed is:

1. In a charge forming device for internal combustion engines, in combination with a rotary impeller disposed in the path of the combustible charge as it moves toward the intake chambers of the engine, a cylindrical casing for said impeller, said casing having a centrally formed extension constituting a confining tubular conduit for the column of air moving toward said impeller, a sleeve slidable along the inner surface of said conduit to regulate the amount of air drawn toward said impeller, a manually operable sleeve actuating member, a fuel supply tube supported within said air conduit in coaxial relation to said impeller, a valve in said tube adapted to regulate the flow of fuel therein, and means movable by said sleeve actuating member to vary the setting of said fuel regulating valve.

2. In a charge forming device for internal combustion engines, in combination with a rotary impeller disposed in the path of the combustible charge as it moves toward the intake chambers of the engine, a cylindrical casing for said impeller, said casing having a centrally formed extension constituting a confining tubular conduit for the column of air moving toward said impeller, a fuel supply tube supported within said air conduit in coaxial relation to said impeller, a chamber in the hub of said impeller in communication with the end of said tube, means for combining the fuel passing into said chamber from said tube with the column of air passing through said impeller, and means for carbureting the air anteriorly of the impeller.

3. In a charge forming device for internal combustion engines, in combination with a multi-blade impeller disposed in the path of the combustible charge as it moves toward the intake chambers of the engine, a confining tubular conduit for the column of air moving toward said impeller, a fuel supply tube supported within said air conduit in coaxial relation to said impeller, a chamber in the hub of said impeller in communication with the end of said tube, means for combining the fuel passing into said chamber from said tube with the column of air passing through said impeller, said means comprising a plurality of passages extending radially outward from said chamber to the surface of said impeller, and means for carbureting the air independently of the impeller.

4. In a charge forming device for internal combustion engines, in combination with a rotary impeller disposed in the path of the combustible charge as it moves toward the intake chambers of the engine, a confining tubular conduit for the column of air moving toward said impeller, a fuel supply tube supported within said air conduit in coaxial relation to said impeller, a chamber in the hub of said impeller in communication with the end of said tube, means for combining the fuel passing into said chamber from said tube with the column of air passing through said impeller, and supplemental means for combining a portion of the fuel charge with the air passing through said conduit.

5. In a charge forming device for internal combustion engines, in combination with a rotary impeller disposed in the path of the combustible charge as it moves toward the intake chambers of the engine, a confining tubular conduit for the column of air moving toward said impeller, a fuel supply tube supported within said air conduit, and means for combining a portion of the fuel charge with the air passing through said conduit, said means comprising an outlet from said fuel tube directly into said air conduit, manual operable means for controlling the air flow through the conduit, means for controlling the fuel flow from the outlet, and said manual operable means being arranged to cooperate with the fuel controlling means to restrict the fuel outlet when the air supply is restricted.

6. In a device of the class described, in combination with a rotary impeller, a diffusing chamber enclosing said impeller, an air conducting chamber anterior of said diffusing chamber connecting with said diffusing chamber and adapted to direct and confine the column of air passing toward said impeller, a fuel supply conduit communicating with said diffusing chamber, means operable by the degree of pressure existing in said air conducting chamber for controlling the amount of fuel drawn through said fuel supply conduit, and means for controlling the amount of air supplied to the impeller.

7. In a charge forming device in combination with a rotary impeller, a diffusing chamber enclosing said impeller, a second chamber connecting with said diffusing chamber, means for introducing a column of air to said second chamber, and means for increasing the velocity of the air as it passes into said second chamber, said means comprising a plurality of flow restricting passages between said introducing means and said second chamber, and means for introducing fuel into the diffusing chamber.

8. In apparatus of the class described, in combination with a rotary impeller, a diffusing chamber enclosing said impeller, a cylindrical chamber connecting with said diffusing chamber, a fuel jet in said cylindrical chamber, means for introducing a column of air to said cylindrical chamber, and means for increasing the velocity of the air as it passes into said chamber said means comprising a plurality of vanes disposed in tangential relation to the circular end of said chamber and spaced so as to divide the entrance to said chamber into a plurality of converging passages, in passing through which the velocity of the air column is increased.

9. In a charge forming device for an engine in combination with a cylindrical chamber communicating with the intake passages of an internal combustion engine, an air intake conduit connecting with said cylindrical chamber and disposed at an angle thereto, and means located in said intake conduit adjacent the point of connection with said cylindrical chamber for causing an increase in the velocity of the column of air prior to its passage into said first named chamber, and means for introducing fuel into the cylindrical chamber.

10. In a charge forming device for an engine in combination with a cylindrical chamber communicating with the intake passages of an internal combustion engine, an air intake conduit connecting with said cylindrical chamber, and means located in said intake conduit for causing an increase in the velocity of the column of air prior to its passage into said first named chamber, said means comprising a plurality of vanes arranged tangentially about the circumference of the wall of said cylindrical chamber in such manner as to form a plurality of tapering passages in passing through which a turbulent motion is imparted to the column of air, and means for introducing fuel into the air intake conduit.

11. In a charge forming device for internal combustion engines, in combination with a rotary impeller disposed in the path of the combustion supporting air charge as it moves toward the intake chambers of the engine, a fuel conduit communicating at one end with a source of liquid fuel and at its other end with said impeller, means for regulating the supply of air being drawn toward said impeller, and means actuated concurrently with the actuation of said air regulating means to produce a corresponding variation in the amount of fuel passing through said fuel conduit, said actuating means including a resilient connection between the fuel and air controls.

12. In a charge forming device for internal combustion engines, in combination with a rotary impeller disposed in the path of the combustion supporting air charge as it moves toward the intake chamber of the engine, a fuel conduit communicating at one end with a source of liquid fuel and at its other end with said impeller, means for regulating the supply of air being drawn toward said impeller, means actuated automatically in response to actuation of said air supply regulating means to produce a corresponding variation in the amount of fuel passing through said fuel conduit, and means for interposing a time element in the operation of said air supply regulating means whereby the variation in the supply of air is made to occur after the variation in the fuel supply has been produced.

13. In a charge forming device for internal combustion engines, in combination with a fuel conduit communicating at one end with a source of liquid fuel and at its other end with the intake manifold of the engine, means for regulating the supply of air being drawn toward said manifold, means actuated automatically in response to actuation of said air supply regulating means to produce a corresponding variation in the amount of fuel passing through said fuel conduit, and means for interposing a time element in the operation of said air supply regulating means whereby the variation in the supply of air is made to occur after the variation in the fuel supply has been produced, said means comprising a diaphragm member connected to said air supply regulating means, and adapted to respond relatively slowly to the creation of a pressure differential by the operation of said air regulating means.

14. In a device of the class described, in combination with a rotary impeller, a diffusing chamber enclosing said impeller, an air conducting chamber connecting with said diffusing chamber and adapted to direct and confine the column of air passing toward said impeller, a fuel supply conduit communicating with said impeller, and means operable by the degree of pressure existing in said air conducting chamber for controlling the amount of fuel drawn through said fuel supply conduit, said means comprising a plurality of obliquely disposed passages leading from said fuel supply conduit into said air conducting chamber.

15. In a device of the class described, in combination with a rotary impeller, a diffusing chamber enclosing said impeller, an air conducting chamber connecting with said diffusing chamber and adapted to direct and confine the column of air passing toward said impeller, a fuel supply conduit communicating with said impeller, and means operable by the degree of pressure existing in said air conducting chamber for controlling the amount of fuel drawn through said fuel supply conduit, said means comprising a fuel supply chamber at the intake end of said fuel supply conduit, and a plurality of passages leading from said air conducting chamber to said fuel supply chamber whereby the pressure existing in said air chamber is effective in said fuel chamber to control the amount of fuel drawn into the intake end of said fuel conduit.

16. In a device of the class described, in combination with a rotary impeller, a diffusing chamber enclosing said impeller, an air conducting chamber connecting with said diffusing chamber and adapted to direct and confine the column of air passing toward said impeller, a fuel supply conduit communicating with said impeller, and means operable by the degree of pressure existing in said air conducting chamber for controlling the amount of fuel drawn through said fuel supply conduit, said means comprising a member adapted to restrict the cross-sectional area of said air conducting chamber at a point adjacent the intake end of said fuel supply conduit, and means for establishing communication between said air chamber and said fuel conduit at said restricted point.

17. In a device of the class described, in combination with a rotary impeller, a diffusing chamber enclosing said impeller, an air conducting chamber connecting said diffusing chamber and adapted to direct and confine the column of air passing toward said impeller, a fuel supply conduit communicating with said impeller, and means operable by the degree of pressure existing in said air conducting chamber for controlling the amount of fuel drawn through said fuel supply conduit, said means comprising a Venturi tube located within said air conducting chamber and means for establishing communication between the narrow portion of said Venturi tube and the intake end of said fuel supply conduit.

18. In a charge forming device for internal combustion engines, in combination with a multi-blade impeller disposed in the path of the combustible charge as it moves toward the intake chambers of the engine, a confining tubular conduit for the column of air moving toward said impeller, a fuel supply tube supported within said air conduit in coaxial relation to said impeller, a chamber in the hub of said impeller in communication with the end of said tube, and means for combining the fuel passing into said chamber from said tube with the column of air passing through said impeller, said means comprising a plurality of passages extending radially outward from said chamber to the surface of said impeller, and registering with a corresponding number of grooves extending along substantially the entire length of the impeller blades.

19. In combination with a rotary supercharger having a recessed portion permitting passage of fluid therethrough, a chamber enclosing said supercharger, an air passage leading to said chamber, a fuel jet subject to the suction existing in said air passage and adapted to discharge fuel therein, and a by-pass for conducting additional fuel from said jet to the said recessed portion of the supercharger.

20. In combination with a rotary supercharger having a recessed portion permitting passage of fluid therethrough, a chamber enclosing said supercharger, an air passage leading to said chamber, a fuel jet subject to the suction existing in said air passage, and a by-pass for conducting the discharge from said jet to the said recessed portion of the supercharger, a throttle valve in said air passage between said jet and supercharger, and a second throttle valve located in said by-pass, and means for jointly operating both said throttle valves.

21. In a fuel feed system for an internal combustion engine, a main passage, a throttle valve, a suction chamber on the atmospheric side of said throttle valve, and connected to said main air passage so as to possess a suction depending on the entering air flow, a jet located in said suction chamber, a by-pass channel from said suction chamber to the engine side of said throttle valve and means for adjusting the distance between the entrance of said by-pass and said jet, to vary the suction through said by-pass channel.

22. In a fuel feed system for an internal combustion engine, a main passage, a throttle valve, a suction chamber on the atmospheric side of said throttle valve, and connected to said main air passage so as to possess a suction depending on the entering air flow, a constant level fuel chamber, a fuel jet in said suction chamber slightly below the fuel level, and a by-pass from said suction chamber to the engine side of the throttle.

23. In a fuel feed system for an internal combustion engine, a main passage, a throttle valve, a suction chamber on the atmospheric side of said throttle valve and connected to said main air passage so as to possess a suction depending on the entering air flow, a jet located in said suction chamber, a by-pass channel from said suction chamber to the engine side of said throttle valve, diaphragm means for operating said throttle valve, and a restricting passage leading to one side of the diaphragm so that it will lag in responding to changes of pressure in the chambers or regions to which it is connected.

24. In a fuel feed system for internal combustion engines, a plurality of passages communicating from a suction chamber to the engine, a fuel jet located in said suction chamber, throttling valves in each passage, one of said valves being controlled by a spring pressed diaphragm so that it maintains a minimum differential of pressure between the two passages.

25. In a fuel feed system for internal combustion engines, a plurality of passages communicating from a suction chamber to the engine, a fuel jet located in said suction chamber, throttling valves in each passage, one of said valves being controlled by a spring pressed diaphragm so that it maintains a minimum differential of pressure between the two passages, and a restricted communication to one side of said diaphragm to retard its response to changes of pressure in the regions to which it is connected.

26. In a carburetor for combustion engines, in combination with an air chamber leading to the engine, a throttle valve in said chamber and an actuating lever therefor, an idling fuel jet feeding to said chamber on the engine side of said throttle valve, and control means for closing said fuel jet, said control means being engageable and movable by said throttle actuating lever as it approaches throttle closing position, and means permitting over-travel of the throttle beyond the closed position of the fuel jet.

27. In a carburetor for combustion engines, in combination with an air chamber leading to the engine, a throttle valve in said chamber and an actuating lever therefor, an idling fuel jet feeding to said chamber on the engine side of said throttle valve, additional means for feeding a starting fuel charge to said chamber on the engine side of said throttle valve, and means for closing said fuel jet in response to a throttle closing movement of said actuating lever, said last named means comprising a jet closing member and a second member adapted to transmit movement of said lever to said jet closing member but yieldable to permit reverse movement of said jet closing member independently of said lever.

28. In apparatus of the class described, in combination with a cylindrical chamber communicating with the intake passages of an internal combustion engine, an air intake conduit connecting with said cylindrical chamber, means located in said intake conduit for imparting a rotary motion to the air as it advances into said cylindrical chamber, a cylindrical sleeve having an axial air passage movable within said chamber, means for moving said sleeve to vary the proportion of air to fuel passing to the engine.

29. In a charge forming device for internal combustion engines, in combination with a rotary impeller disposed in the path of the combustible charge as it moves toward the intake chambers of the engine, a confining tubular conduit for the column of air moving toward said impeller, a fuel supply tube supported within said air conduit in coaxial relation to said impeller, a chamber in the hub of said impeller in communication with the end of said tube, and means for discharging the fuel from said chamber to the column of air, said discharging means comprising a plurality of outlet passages through said impeller and means for supplying fuel to the air entering the tubular conduit.

30. In a charge forming device for an internal combustion engine, means forming an intake passage, a mechanically driven rotary member therein having radially extending fuel conducts, means for delivering a fuel and air mixture to the passage anteriorly of the rotary member, and means for introducing liquid fuel through the conduits to the passage posteriorly of the rotary member.

31. In a charge forming device for an internal combustion engine, means forming an intake passage, a mechanically driven rotary member therein having a hub, means for delivering a fuel and air mixture to the passage anteriorly of the rotary member, and means including radial conduits in the member for introducing liquid fuel to the passage posteriorly of the rotary member through the hub of the member.

32. In a charge forming device for an internal combustion engine, means forming an intake passage, a mechanically driven rotary member therein having a hub, a carburetor connected to the passage for supplying a fuel mixture anteriorly of the member, means for supplying liquid fuel posteriorly of the member by directing it through the hub of the member including fuel conduits extending radially of the member, and means for controlling both the liquid fuel supply and the mixture supply.

FRANK C. MOCK.